No. 766,211. PATENTED AUG. 2, 1904.
D. ABELES.
PIVOT PIN GRINDING DEVICE FOR WATCHMAKERS.
APPLICATION FILED JULY 26, 1902.
NO MODEL.
Fig. 1
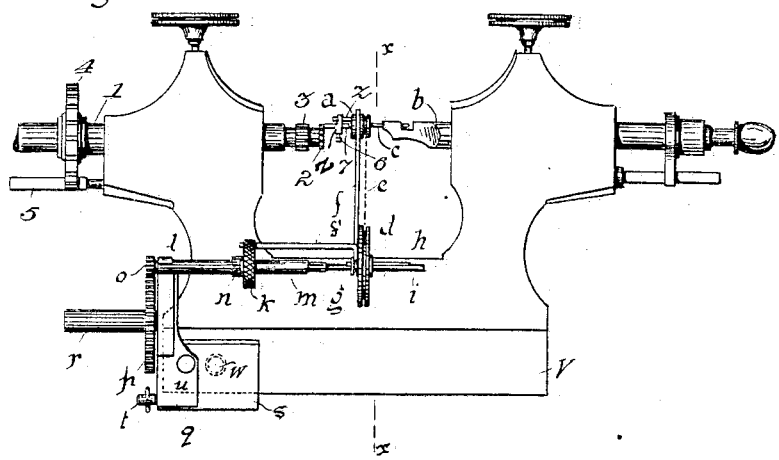
Fig. 2
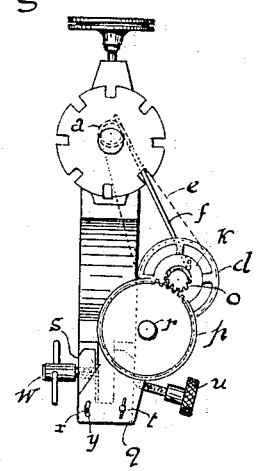
Fig. 3
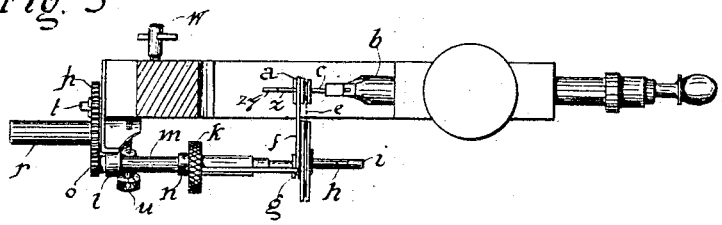
Fig. 4
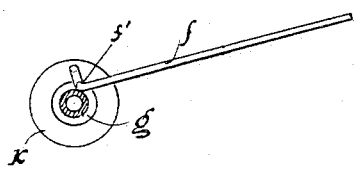
Fig. 5
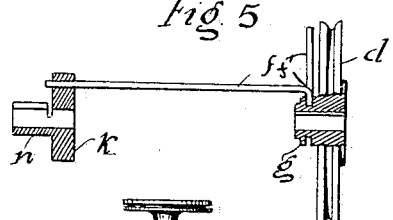
Fig. 6
Fig. 7
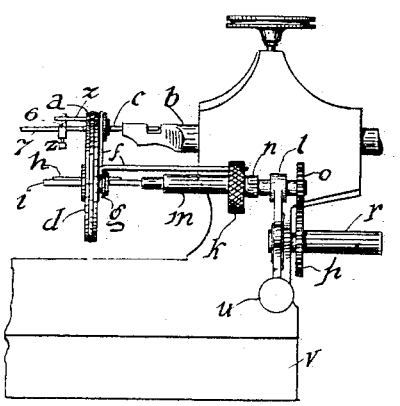
Witnesses.
Hiroshi Mori
Ludwig Flamm
Inventor.
David Abeles
by B. Singer
Att'y.

No. 766,211. Patented August 2, 1904.

UNITED STATES PATENT OFFICE.

DAVID ABELES, OF VIENNA, AUSTRIA-HUNGARY.

PIVOT-PIN-GRINDING DEVICE FOR WATCHMAKERS.

SPECIFICATION forming part of Letters Patent No. 766,211, dated August 2, 1904.

Application filed July 26, 1902. Serial No. 117,114. (No model.)

*To all whom it may concern:*

Be it known that I, DAVID ABELES, a subject of the Emperor of Austria-Hungary, residing at VII Seidengasse 44, Vienna, Austria-Hungary, have invented certain new and useful Improvements in Pivot-Pin-Grinding Devices for Watchmakers, of which the following is a specification.

This invention relates to mechanism for driving pivot-pin-grinding devices for watchmakers; and its objects are to produce a simple mechanism for driving the disk or sheave which turns the pin in such a manner that the pin may be turned with a uniform motion and may be securely held while being ground.

It consists in the novel features set forth hereinafter.

In the drawings, Figure 1 is a front elevation of a pivot-pin-grinding device with adjustable driving mechanism; Fig. 2, a transverse section on the line $xx$ of Fig. 1; Fig. 3, a plan view, partly in section. Figs. 4 and 5 are details of the driving mechanism. Figs. 6 and 7 are modifications of the construction shown in Fig. 1, in side elevation and transverse section, respectively.

As shown in Figs. 1 to 4, the sheave $a$, which runs loosely on the shaft $c$, secured in the adjustable tail-stock spindle $b$ of the tappet device, has an annularly-grooved hub and is driven from sheave $d$ by means of connecting-belt $e$. The wheel or sheave $d$ is mounted on the main shaft $i$ of the driving-train and shiftably secured thereon by means of a spline $h$. Its hub $g$ has an annular groove for the reception of a saddle $f'$ at the junction of the two arms of the right-angled lever $f$. This lever consists of a bent wire, and the saddle $f'$ is formed at the bend of the wire to take into the groove in the hub $g$. One arm of this lever is fixed in a milled disk $k$, near the periphery thereof, and extends thence to the hub $g$, where its saddle permanently engages the groove, while the other arm extends up from said saddle toward the sheave $a$ and the groove in the hub of the latter. The disk $k$ has a split hub $n$, which elastically embraces the cylindrical frame-sleeve $m$. This sleeve extends rigidly forward from supporting-block $l$ and forms a bearing for main shaft $i$. Thus said disk can be slipped along the sleeve or turned therearound with the application of a little force, but will be securely held in position thereon by its spring-hub when left alone. Close behind the block $l$ is a pinion $o$, fixed to the end of main shaft $i$ and meshing constantly with the gear-wheel $p$. This latter is fixed to twirling spindle $r$, journaled in angular support $q$ and which serves as a driving device for the apparatus, as hereinafter explained.

The angular support or frame-piece $q$, which carries or contains the bearings for the spindle $r$ and shaft $i$ of the apparatus, including the sleeve $m$, is detachably secured to the shoe $s$ by means of set-screw $t$ and this latter to the foot-piece $v$ of the frame of the machine by set-screw $w$ in the same manner. The former is also slightly revoluble around set-screw $t$ by means of adjusting-screw $u$, which acts against the lateral surface of the shoe, the extent of such movement being limited by the pin $x$ from the shoe taking into the curved slot $y$ in the frame-piece.

A shaft or head-stock 1 is horizontally mounted in the frame with its axis in the same plane, but somewhat below the shaft $c$. This shaft is provided at the forward end with heads 2 and 3, having segmental grooves of different sizes cut therein, the centers of said grooves being in alinement with the center of the shaft $c$. On the opposite end of the shaft 1 is mounted a notched wheel 4, having notches corresponding to the grooves in the heads 2 and 3. When the wheel 4 is turned to bring one of the grooves to its upper alining position, it may be locked in position by means of a pin 5 inserted in the frame of the machine. A pin $z$ is fastened at one side of the sheave $a$ and is adapted to engage the arm of a lathe-dog 6, which may be secured to the pivot-pin 7 which is to be ground.

The operation is as follows: The pin or spindle 7 which is to be ground is centered on the shaft $c$ and is supported at the opposite end in one of the grooves of the heads 2 or 3, depending on the size and length of the pin. Thus if a long pin is to be ground one of the notches of the head 3 is brought into alinement with the center of the shaft $c$ and the end of the pin is caused to rest in or be supported in said groove. As the spindle or pin is rotated by the turning mechanism a file or grinding device is held against the end of the pin adjacent to the head in such a manner that the end of the pin is ground or sharpened, as desired. The dog 6 is secured to the pin 7 and engages with the pin $z$, by means of which it is turned to revolve the pin 7. When the sheave has been brought into the proper relation to the work, the disk $k$ is slipped along the sleeve $m$, carrying with it the right-angled lever and the sheave $d$ until the free arm of the lever is immediately over the groove in the hub of the tappet-sheave. Then said disk is revolved around sleeve $m$ until the upper end of the lever engages in said groove, thus locking the two sheaves in alinement with each other and by the resilient engagement of the disk with the sleeve holding them in adjusted position. Then by loosening the set-screw $t$ and setting up adjusting-screw $u$ the belt is properly tightened, after which the frame-piece is again fixed in position by tightening down set-screw $t$, and the apparatus is ready for action.

The device is driven by simply rotating twirling spindle $r$ between the thumb and forefinger of one hand while the other is engaged with the work. This communicates motion through gear $p$, pinion $o$, shaft $i$, sheave $d$, and belt $e$ to the sheave $a$.

Instead of the belt-driver the apparatus may be driven by friction-wheels $a'$ $d'$, adjustable by screw $u'$, as shown in Figs. 6 and 7.

Having thus described my invention, what I claim as new, and desire to secure by Letters Patent, is—

1. The combination with the adjustable pivot-pin-holding sheave having an annularly-grooved hub, of the transmission-wheel $d$ also having a grooved hub, the shaft $i$ to which said wheel is splined, a sleeve-bearing for said shaft, the disk $k$ mounted on the sleeve-bearing and having a split hub elastically embracing the sleeve, the right-angled bar having one arm secured to said disk, and having a saddle at its angle fitting into the groove in hub of wheel $d$, and the other arm extending up to engage the groove in hub of the sheave, and a twirling spindle for communicating motion to said shaft and wheel and through the latter to the sheave.

2. The combination with the spindle or pivot-pin-holding sheave, and its driving-sheave and the main shaft to which it is splined, of the belt connecting the two, the angular frame-piece, the sleeve-bearing extending from said frame-piece to receive the main shaft, the elastically-clasping disk slidable and rotatable on the sleeve, the angular bar having one arm held in said disk, and an intermediate portion saddling a groove in the hub of the driving-sheave, and its other arm adapted to engage a groove in the hub of the spindle-sheave, the shoe, the set-screw clamping the frame-piece to the shoe, the adjusting-screw to tighten the belt by rocking the frame-piece on said set-screw as a pivot, the twirling spindle having bearing on the frame-piece, the spur-gear on said spindle, and the spur-pinion on the rear end of the main shaft.

In witness whereof I have hereunto signed my name, this 1st day of July, 1902, in the presence of two subscribing witnesses.

DAVID ABELES.

Witnesses:
AUG. T. KNOPSCHNACHER,
ALVESTO S. HOGUE.